United States Patent [19]

O'Sullivan et al.

[11] Patent Number: 4,859,018

[45] Date of Patent: Aug. 22, 1989

[54] OPTICAL FIBER BANDWIDTH LIMITING

[75] Inventors: Maurice S. O'Sullivan, Ottawa; Hyung B. Kim, Kanata; Vincent C. So; Paul J. Vella, both of Ottawa, all of Canada

[73] Assignee: Northern Telecom Limited, Montreal, Canada

[21] Appl. No.: 61,625

[22] Filed: Jun. 15, 1987

[51] Int. Cl.$^4$ .............................................. G02B 6/28
[52] U.S. Cl. .............................. 350/96.16; 350/96.15
[58] Field of Search ........................... 350/96.16, 96.15

[56] References Cited

U.S. PATENT DOCUMENTS

| | | | |
|---|---|---|---|
| 4,136,929 | 1/1979 | Suzaki | 350/96.16 |
| 4,184,744 | 1/1980 | Onoda et al. | 350/96.31 |
| 4,348,075 | 9/1982 | Gottlieb et al. | 350/96.13 |
| 4,368,543 | 1/1983 | Hasegawa | 350/96.14 |
| 4,405,199 | 9/1983 | Ogle et al. | 350/96.19 |
| 4,469,397 | 9/1984 | Shaw et al. | 350/96.15 |
| 4,479,701 | 10/1984 | Newton et al. | 350/96.16 |
| 4,511,207 | 4/1985 | Newton et al. | 350/96.15 |
| 4,530,097 | 7/1985 | Stokes et al. | 350/96.15 |
| 4,530,603 | 7/1985 | Shaw et al. | 350/96.29 |
| 4,579,417 | 4/1986 | Ih | 350/96.12 |
| 4,615,582 | 10/1986 | Lefevre et al. | 350/96.29 |
| 4,652,079 | 3/1987 | Shaw et al. | 350/96.15 |
| 4,696,063 | 9/1987 | Schembri | 350/96.16 |
| 4,708,421 | 11/1987 | Desurvire et al. | 350/96.16 |

OTHER PUBLICATIONS

"All Fiber Sensing Loop Using Pulse-Modulated Light-Emitting Diode", by G. Adamovsky, Electronics Letters, Sep. 26, 1985, vol. 21, No. 20, pp. 922-923.
"Time Domain Referencing in Intensity Modulation Fiber Optic Sensing Systems", by G. Adamovsky, SPIE (Society of Photo-Optical Instrumentation Engineers), vol. 661, Optical Testing and Metrology (1986), pp. 145-151.
Article Entitled, "Bit Rate Limiting as an Alternative to Facility Bypass", by Venkata A. Bhagavatula et al., Corning Glass Works, Corning, N.Y. 14830, IEEE Publication CH2424-0/870000-0198, pp. 6.8.1-6.8.4., International Conference on Communications 1987, Jun. 8.

Primary Examiner—William L. Sikes
Assistant Examiner—Robert E. Wise
Attorney, Agent, or Firm—R. John Haley

[57] ABSTRACT

A bandwidth limiter for an optical fiber transmission path comprises a four-port optical coupler via which an optical signal is passed. A spliced optical fiber provides a loop, from an output to an input of the coupler, with a predetermined propagation delay and attenuation. An alternative arrangement uses two couplers which are coupled together via fibers of different length and hence propagation delay.

4 Claims, 2 Drawing Sheets

OPTICAL FIBER BANDWIDTH LIMITING

This invention relates to a method of and apparatus for limiting the bandwidth of an optical fiber transmission path.

For the transmission of data and other information signals it is becoming increasingly common to employ optical fiber transmission paths, which are known to have a relatively large bandwidth so that they can carry signals at relatively arbitrary transmission speeds or bit rates. As the revenues of a company providing an optical fiber transmission path for use by customers may be tied to a transmission speed allocated for such transmission, with higher transmission speeds corresponding to higher revenues, it is desirable for such a company to ensure that transmission speeds greater than that paid for are not used by its customers.

Although monitoring of the transmission speed actually used can be achieved by accessing the terminal equipment coupled to the optical transmission path, this is undesirable as such equipment may be located in a customer's premises. Furthermore, such monitoring can be achieved by optically coupling from the transmission path part of the transmitted signal and determining the transmission speed, but this is inconvenient and expensive in that it requires the use of relatively complicated equipment which must be allocated or switched to one transmission path at a time.

Accordingly, a need exists to provide a convenient and relatively inexpensive solution to this problem. An object of this invention is to provide a method and apparatus facilitating such a solution.

According to one aspect of this invention there is provided a method of limiting bandwidth on an optical fiber transmission path carrying an optical signal, comprising the steps of: delaying a component of the optical signal with a predetermined delay; and combining the optical signal with the delayed component thereof to produce a resultant optical signal for further transmission on said path.

Thus the invention is based on the recognition that the bandwidth on an optical fiber can be limited by combining an optical signal with a delayed version of itself, the extent of delay determining the resultant bandwidth. Whilst this results in some degradation of optical signals within this resultant bandwidth, such degradation has been found to be able to be accommodated by typical optical fiber communications systems.

The method preferably includes the step of attenuating the delayed optical signal component with a predetermined attenuation.

According to another aspect, the invention provides a method of limiting bandwidth on an optical fiber transmission path carrying an optical signal, comprising the steps of: supplying the optical signal to a first input, and deriving a bandwidth-limited optical signal from a first output, of an optical signal coupler; and coupling a second output of the coupler to a second input thereof via an optical fiber providing a predetermined propagation delay and a predetermined attenuation. Preferably the coupler has a coupling coefficient $\alpha$ from the first input to the second output and a transfer coefficient $\beta$ from the first and second inputs to the first and second outputs, the optical fiber provides a transfer coefficient $\beta'$ from the second output to the second input of the coupler whereby the predetermined attenuation is $1-\beta'$, and $\alpha$ is substantially equal to $(1+\beta\beta')/(1+2\beta\beta')$.

The invention also extends to an optical signal bandwidth limiter comprising: optical signal coupling means having first and second inputs and first and second outputs, optical fiber means for supplying an optical signal to the first input and for deriving a bandwidth-limited optical signal from the first output of the coupling means; and an optical fiber path providing a predetermined propagation delay and a predetermined attenuation coupled from the second output to the second input of the coupling means.

The optical fiber path conveniently comprises an optical fiber having a predetermined length providing said predetermined propagation delay and a splice providing said predetermined attenuation. This enables the limiter to be provided in a convenient, compact, accurate, and inexpensive manner.

The invention will be further understood from the following description with reference to the accompanying drawings, in which.

Figure 1:
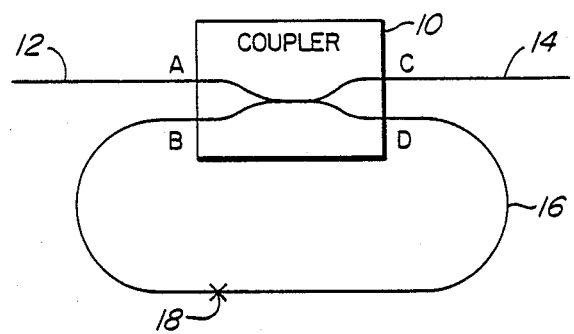
FIG. 1 is a schematic illustration of a bandwidth limiter according to an embodiment of the invention.

Referring to FIG. 1, there is illustrated an optical fiber transmission path bandwidth limiter which comprises a four-port optical coupler 10 and optical fibers 12, 14, and 16. The coupler 10 has two input ports A and B and two output ports C and D. The fibers 12 and 14 constitute input and output paths of the bandwidth limiter and are coupled to the ports A and C respectively. The fiber 16 has a predetermined length L and is coupled from the output port D back to the input port B. A predetermined attenuation or loss is provided in the path of the fiber 16 from the port D to the port B. In FIG. 1 this is provided by a fiber splice, represented at 18, but it could instead be provided by micro-bending of the fiber 16 or by providing some other form of attenuator therein.

The bandwidth limiter of FIG. 1 operates on the basis that each pulse of an optical signal supplied via the input fiber 12 produces a series of pulses, separated in time due to the propagation delay via the fiber 16 and of successively decreasing amplitude due to the loss in this fiber, in the output fiber 14. For transmission speeds on the fiber 12 at frequencies for which the period is greater than the delay time via the fiber 16, there is a signal degradation which is sufficiently small (for example, less than 2 dB eye closure penalty for a binary transmission system), that it can be tolerated by most optical fiber transmission systems, whereby the transmitted signal can be properly received. For higher transmission speeds, at frequencies for which the period is equal to or less than the delay time via the fiber 16, the signal degradation rapidly increases to such a level that reception of the transmitted signal is impossible. This is explained further below with reference to FIG. 3.

Thus the delay time, for an optical signal to pass once around the loop provided via the fiber 16, determines an upper limit for the bit rate at which optical signals can be effectively communicated via the bandwidth limiter. Such a bandwidth limiter can therefore be designed to provide any desired upper limit to the speed at which optical signals may be transmitted via an optical fiber, in an inexpensive manner and without necessitating access to the signal itself.

In determining an appropriate design for the bandwidth limiter, in addition to the length L of the fiber 16 the following parameters are important:

$\alpha$—the coupling coefficient of the coupler 10; this is the fraction of an input signal at the coupler input port A which is produced at the output port D.

$\beta$—the transfer coefficient of the coupler 10; this is the fraction of combined input signals at the coupler input ports A and B which is produced in combination at the coupler output ports C and D; the quantity $1-\beta$ is referred to as the excess loss coefficient of the coupler.

$\beta'$—the transfer coefficient of the splice 18; the quantity $1-\beta'$ is the splice loss coefficient, or more generally the coefficient of loss or attenuation around the loop provided by the fiber 16.

The bandwidth of the limiter is the ratio of Fourier transforms of output to input pulses, and is a cyclic function with maxima when $\omega\Delta t = 2m\pi$ and minima when $\omega\Delta t = (2m+1)\pi$, where $\Delta t = nL/c$ is the delay time around the fiber 16, $\omega$ is angular frequency, n is the refractive index of the fiber 16, c is the velocity of light, and m is zero or positive integer. The limiter is optimally designed so that the minima of this cyclic function have zero values; this occurs when $\alpha = (1+\beta\beta')/(1+2\beta\beta')$.

It can be shown that the d.c. transfer coefficient for the bandwidth limiter is equal to $\beta(1-\alpha) + \beta'(\alpha\beta)^2/(1-\beta\beta'(1-\alpha))$. For an ideal, no loss, case in which $\beta = \beta' = 1$ and the above transfer coefficient has a value of one, $\alpha = \frac{2}{3}$ or 0.67. For realistic couplers and bandwidth limiters, $\beta$ and $\beta'$ are less than one, and accordingly $\alpha$ is selected to be greater than 0.67.

Figure 2:
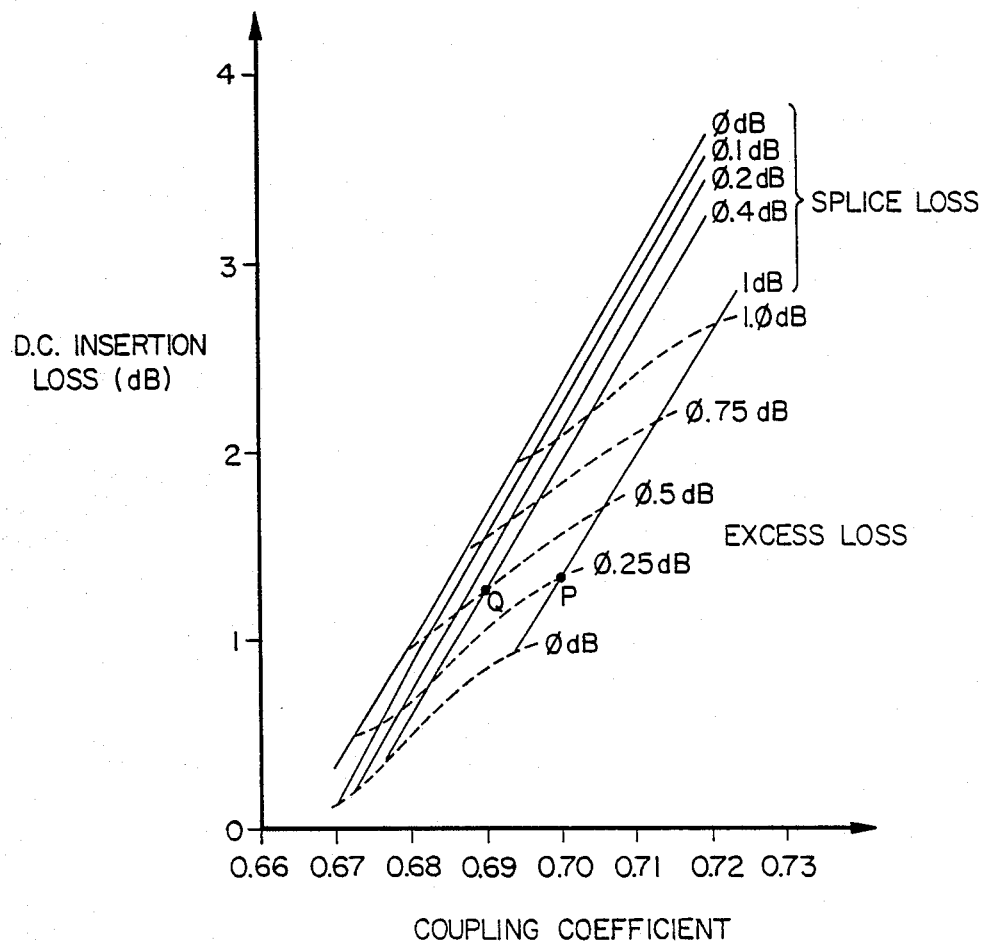
FIGS. 2 and 3 are graphs with reference to which the design of the apparatus of FIG. 1 is explained.

FIG. 2 is a graph illustrating d.c. insertion loss as a function of the coupling coefficient $\alpha$, the latter being selected optimally in relation to the values of $\beta$ and $\beta'$ as defined in the above equation. Solid lines in FIG. 2 are lines of constant splice loss (i.e. constant $\beta'$) and broken lines in FIG. 2 are lines of constant coupler excess loss (i.e. constant $\beta$).

Thus in designing a bandwidth limiter in accordance with this embodiment of the invention, initially a maximum value of d.c. insertion loss may be selected; for example this may be 2 dB. A coupler may then be selected with an excess loss and coupling coefficient which provide a d.c. insertion loss less than this maximum value, and the splice loss adjusted to correspond to the resulting intersection point in FIG. 2. For example, a coupler may be selected with a coupling coefficient of 0.70 and an excess loss of 0.25 dB, and the splice loss controlled to be 1 dB (point P in FIG. 2), or the coupler may be selected to have a coupling coefficient of 0.69 and an excess loss of 0.5 dB, the splice loss being controlled to be 0.4 dB (point Q in FIG. 2), with a resultant d.c. insertion loss of about 1.3 dB in either case.

Figure 3:
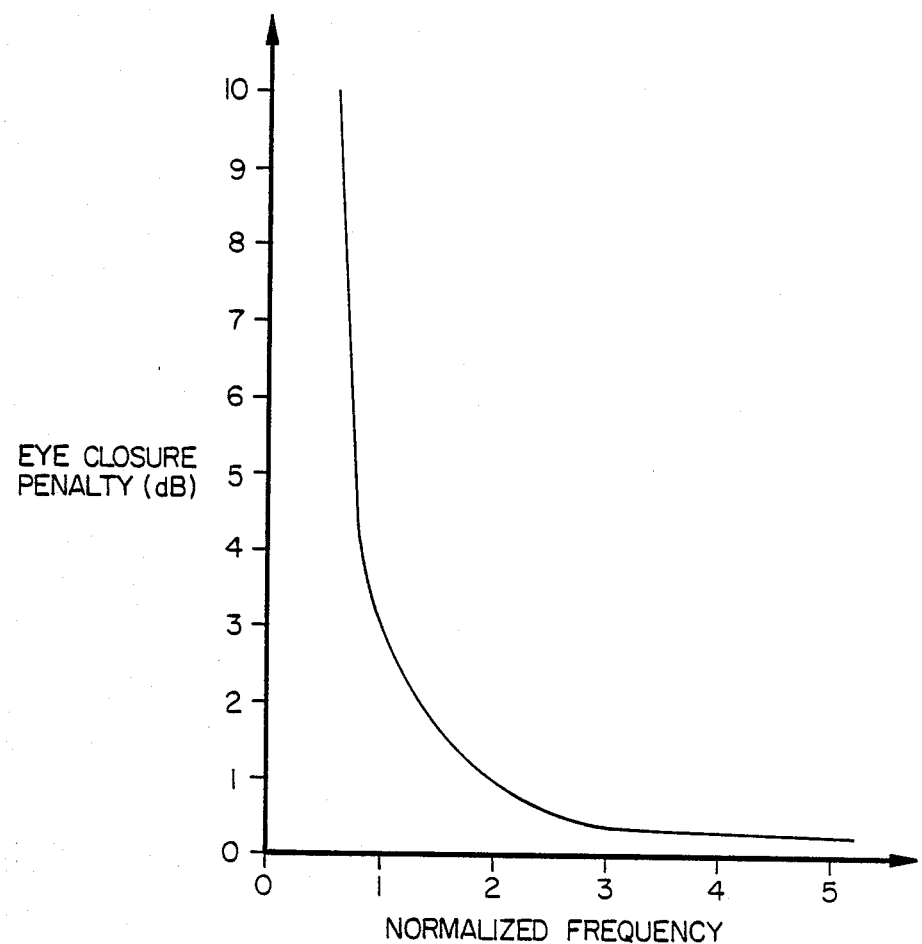

FIG. 3 is a graph illustrating the eye closure penalty, which results from use of the bandwidth limiter in a binary transmission system, as a function of normalized frequency. The normalized frequency is the ratio of the null frequency, for which the limiter is designed by selection of the length L of the fiber 16, to the actual transmission rate or frequency. From the above description, it should be appreciated that for this null frequency $\omega_n m = 0$, hence $\omega_n nL/c = \pi$.

As can be seen from FIG. 3, the eye closure penalty is small for low transmission frequencies (normalized frequency $> 1$), and is very large for a frequency which is twice the null frequency (normalized frequency $= 0.5$). The null frequency, determined by the length L, can be selected relatively arbitrarily to accommodate a desired balance between eye closure penalties at allowable and prohibited transmission frequencies.

By way of example, it is assumed here that it is desired to permit optical signal transmission at a bit rate of 45Mb/s and to prevent transmission at the higher bit rate of 135Mb/s, these bit rates being typical of currently used optical signal transmission systems. In order to provide a very large eye closure penalty, effectively preventing transmission, at 135Mb/s a null frequency of half this, or 62.5 MHz, may be chosen. Hence $\omega_n = 2\pi \times 62.5 \times 10^6$. Using the equation $\omega_n nL/c = \pi$, with a refractive index $n = 1.44$ this gives a fiber 16 length of $L = 1.54$ m. At the desired transmission speed of 45Mb/s the normalized frequency is 1.4 and from FIG. 3 the eye closure penalty is about 1.6 dB, which with the 1.3 dB d.c. insertion loss discussed above results in a total insertion loss due to the bandwidth limiter of about 2.9 dB. If a total insertion loss which is lower than this is desired, a higher null frequency may be selected to decrease the eye closure penalty and/or a lower d.c. insertion loss may be provided.

Although in FIG. 1 the coupler 10 is illustrated as being a fiber-type coupler, any other type of coupler, for example a beam splitter/combiner, having two input and two output ports may be used. In addition, as already described the splice 18 may be replaced or supplemented with any other desired form of attenuator.

Figure 4:
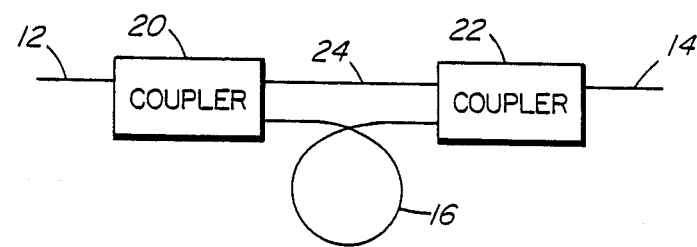
FIG. 4 is a schematic illustration of a bandwidth limiter according to another embodiment of the invention.

FIG. 4 illustrates an alternative form of bandwidth limiter, which may be preferred for high frequency ($> 1$ GHz) use, in which two three-port optical couplers 20 and 22 are used. The input fiber 12 is coupled to a single input port of the coupler 20, and a single output port of the coupler 22 is coupled to the output fiber 14. Two output ports of the coupler 20 are coupled to respective input ports of the coupler 22 via a short fiber 24 and a longer fiber 16, which may include attenuation as described with reference to FIG. 1. Thus in this arrangement each input pulse produces only two output pulses, rather than a continuing series as in the limiter of FIG. 1. A greater number of pulses may be combined using further, different length, fibers 16 between respective coupler ports.

Numerous other variations, modifications, and adaptations may be made to the described embodiments without departing from the scope of the invention as defined in the claims. For example, several limiters may be used in series and/or parallel arrangements, and switching may be provided among fibers 16 of different lengths and/or attenuations.

What is claimed is:

1. A method of limiting bandwidth on an optical fiber transmission path carrying an optical signal, comprising the steps of:
   supplying the optical signal to a first input, and deriving a bandwidth-limited optical signal from a first output, of an optical signal coupler; and
   coupling a second output of the coupler to a second input thereof via an optical fiber providing a predetermined propagation delay and a predetermined attenuation;
   wherein the coupler has a coupling coefficient $\alpha$ from the first input to the second output and a transfer coefficient $\beta$ from the first and second inputs to the first and second outputs, the optical fiber provides a transfer coefficient $\beta'$ from the second output to the second input of the coupler whereby the predetermined attenuation is $1-\beta'$, and $\alpha$ is substantially equal to $(1+\beta\beta')/(1+2\beta\beta')$.

2. A method as claimed in claim 1 and including the step of splicing the optical fiber between the second output and second input of the coupler to provide said predetermined attenuation.

3. An optical signal bandwidth limiter comprising:
   optical signal coupling means having first and second inputs and first and second outputs;
   optical fiber means for supplying an optical signal to the first input and for deriving a bandwidth-limited optical signal from the first output of the coupling means; and
   an optical fiber path providing a predetermined propagation delay and a predetermined attenuation coupled from the second output to the second input of the coupling means;
   wherein the coupling means comprises a two-input two-output optical signal coupler having a coupling coefficient $\alpha$ from the first input to the second output and a transfer coefficient $\beta$ from the first and second inputs to the first and second outputs, the optical fiber path provides a transfer coefficient $\beta'$ from the second output of the second input of the coupler, whereby the predetermined attenuation is $1-\beta'$, and $\alpha$ is substantially equal to $(1+\beta\beta')/(1+2\beta\beta')$.

4. A limiter as claimed in claim 3 wherein the optical fiber path comprises an optical fiber having a predetermined length providing said predetermined propagation delay and a splice providing said predetermined attenuation.

* * * * *